United States Patent [19]
Donker et al.

[11] Patent Number: 6,106,939
[45] Date of Patent: Aug. 22, 2000

[54] ALIPHATIC PETROLEUM-BASED RESINS HAVING CONTROLLED SOFTENING POINTS AND MOLECULAR WEIGHTS AND HOT MELT PRESSURE SENSITIVE ADHESIVE CONTAINING SAME

[75] Inventors: Christiaan Pieter Donker, Heinkenszand; Berend Lenselink, Arnemviden; Michael Hendrikus Theelen, West Kapelle, all of Netherlands

[73] Assignee: Hercules Incorporated, Wilmington, Del.

[21] Appl. No.: 08/813,969

[22] Filed: Mar. 3, 1997

[51] Int. Cl.[7] .............................. C09J 7/02; C09J 109/06
[52] U.S. Cl. .................................. 428/355 BL; 524/526; 525/99
[58] Field of Search ....................... 428/355 BL; 525/99; 524/526

[56] References Cited

U.S. PATENT DOCUMENTS

| | | | |
|---|---|---|---|
| 3,951,928 | 4/1976 | Leckie | 526/66 |
| 4,680,333 | 7/1987 | Davis | 524/394 |

FOREIGN PATENT DOCUMENTS

| | | | |
|---|---|---|---|
| WO 91/07472 | 5/1991 | WIPO | C09J 153/00 |
| WO 95/16755 | 6/1995 | WIPO | C09J 153/02 |

*Primary Examiner*—Robert Dawson
*Assistant Examiner*—D. Aylward
*Attorney, Agent, or Firm*—Robert P. O'Flynn O'Brien

[57] ABSTRACT

The invention provides a petroleum-based aliphatic resin having: a) a Ring and Ball (R&B) softening point in the range of about 75 to about 110° C., b) a weight average molecular weight (Mw) of about 1000 to about 2600 Dalton, a z-average molecular weight (Mz) from about 1900 to about 5000 Dalton and an Mw/Mn below about 2.0, c) a level of aromatic protons below about 1.5% with respect to the total protons determined by $^1$H-NMR, and d) a mixed methylcyclohexane aniline cloud point (MMAP) of about 90° C. or less. The resins according to the invention are characterized by a high amount of cyclic structures. Further disclosed is a method of independently controlling the R&B softening point and the molecular weight of an aliphatic resin composition during its preparation by polymerization of a petroleum-based feed, the method being characterized in that the amount of cyclic structures in the resins is increased.

17 Claims, No Drawings

ALIPHATIC PETROLEUM-BASED RESINS HAVING CONTROLLED SOFTENING POINTS AND MOLECULAR WEIGHTS AND HOT MELT PRESSURE SENSITIVE ADHESIVE CONTAINING SAME

DESCRIPTION OF THE INVENTION

This invention relates to aliphatic resins useful for tackifying purposes wherein the amount of cyclic, crosslinked or networked structures is increased and controlled in such a manner that a better relation between the R&B softening point and the molecular weight and a better compatibility to aromatic solvents is obtained. These resins have an improved adhesive performance in hot melt pressure sensitive adhesive compositions.

BACKGROUND OF THE INVENTION

Hot melt pressure sensitive adhesives usually include a mixture of a polymer or copolymer (in the following, the term "polymer" will be used for both homopolymers and copolymers), preferably a block copolymer, a petroleum tackifier resin and optionally further components such as an extender oil (also named processing oil), fillers and some additives like antioxidants or colorants.

The above polymer often is an S-I-S (styrene-isoprene-styrene) block copolymer having polystyrene and polyisoprene block segments. In such a case, the adhesive composition may additionally include some polystyrene-polyisoprene diblocks.

The petroleum-based resin exerts an important influence on the physico-chemical properties of the adhesive such as its hot melt viscosity, compatibility to aromatic solvents, shear properties and tack properties. To attain the optimum profile of a low melt viscosity, good compatibility to organic solvents, high tack and shear properties without losing high temperature shear performance, conventional petroleum-based tackfying resins used to contain a certain amount of aromatic modifications. Prior art resins with no aromatic modification failed to attain the above properties to a satisfactory extent.

The following patents and/or patent applications may be mentioned as related documents of interest:

U.S. Pat. No. 4,411,954 describes the use of aliphatic resins prepared as described in U.S. Pat. No. 3,577,398 in S-I-S based hot melt pressure sensitive adhesives.

EP 0447855 describes the use of aliphatic and aromatic modified aliphatic resin in S-I-S based hot melt pressure sensitive adhesives. The used levels of aromatic modification were between 11 and 15%, and styrene was mentioned as the aromatic monomer.

U.S. Pat. No. 4,623,698 describes the use of aliphatic and aromatic modified aliphatic resins with softening points from 0 to 80° C. as tackifier in styrene butadiene polymers.

U.S. Pat. No. 4,078,132 describes the preparation of aliphatic and aromatic modified aliphatic resins from heat-soaked piperylene streams. Isobutylene and isoamylene are described to act as chain transfer agent and alpha-methylstyrene (AMS) is described to be used as a aromatic modifier. Some applications are described using resins with softening points between 70 and 85° C.

Wo 95/16755 describes a hot melt adhesive formulation using a S-I-S polymer, an aromatic modified aliphatic resin and an extender oil. The aromatic modification caused hot melt pressure sensitive adhesive formulations having a low viscosity and enhanced tack properties.

Aromatic modified tackifying resins, however, are disadvantageous for a number of reasons. Firstly, aromates are relatively expensive, and the use of no aromate would make the resin cheaper. Secondly, aromatic modified resins are less suitable for hydrogenation, hydrotreatment and quenching processes to improve the resin color, before they are used in any application. Thirdly, aromatic modified aliphatic resins result in lower shear performance at higher temperatures in hot melt based pressure sensitive applications. It would therefore be desirable to provide a cheaper petroleum-based resin which exhibits similar or even better application properties than aromatic modified resins.

It is also desirable to provide aliphatic resins which are useful in hot melt pressure sensitive adhesive compositions and combine a low melt viscosity with excellent tack and shear properties, and a hot melt pressure sensitive adhesive containing such resins.

Accordingly, it was found that aliphatic resins having an increased amount of cyclic structures had the desired R&B softening points and molecular weights and resulted in a low viscosity hot melt pressure sensitive adhesive composition having excellent tack and shear properties without losing its high temperature shear performance. The resins of the present invention are particularly distinguished from aliphatic resins of the state of the art in that they contain a higher amount of cyclic structures. The term "cyclic structure" is defined as any structure feature which serves to increase the level of crosslinking or network structure in the resin. These types of structural features can be the result of, but are not limited by, the following reactions: back biting of its growing polymer chain to incorporate cyclic structures along a backbone and/or at chain termination, dimerization of monomers to produce reactive cyclic structures which can be incorporated in the polymer chains, intramolecular linking of pendent groups within a polymer chain, and crosslinking between short polymer chains to form highly networked structures. This can be confirmed by determining a number of physicochemical properties which are indicative for cyclic structures. It was further found that the amount of cyclic structures allows an independent control of the R&B softening point and the molecular weight of a resin.

SUMMARY OF THE INVENTION

In view of the above, the present invention provides a petroleum-based aliphatic resin having
a) a Ring and Ball (R&B) softening point in the range of about 75 to about 110° C.;
b) a weight average molecular weight (Mw) of about 1000 to about 2600 Dalton, a z-average molecular weight (Mz) from about 1900 to about 5000 Dalton and an Mw/Mn below about 2.0;
c) a level of aromatic protons below about 1.5% with respect to all protons determined by $^1$H-NMR;
d) a mixed methylcyclohexane aniline cloud point (MMAP) of about 90° C. or less.

In a further embodiment, the invention provides a hot melt pressure sensitive adhesive composition comprising
(i) about 100 parts by weight of a Styrene-Isoprene-Styrene (S-I-S) rubber;
(ii) about 70 to about 200 parts by weight of a petroleum-based aliphatic resin having a Ring and Ball (R&B) softening point in the range of about 75 to about 110° C.;
a weight average molecular weight (Mw) of about 1000 to about 2600 Dalton, a z-average molecular weight (Mz) from about 1900 to about 5000 Dalton and an Mw/Mn below about 2.0;

a level of aromatic protons below about 1.5% with respect to all protons determined by $^1$H-NMR; and (iii) about 0 to about 70 parts by weight of an extender oil, characterized in that the composition has a maximum viscosity of about 100,000 mPas, preferably about 80,000 mPas, measured according to ASTM method D3236 at 175° C. with a Brookfield viscosity meter.

Furthermore, the present invention provides a method of controlling the R&B softening point and the molecular weight of an aliphatic resin composition independently of each other, which method is characterized in that the amount of cyclic structures in the resins is increased. This increase can preferably be achieved by varying one or more of the following parameters in the polymerization reaction:

(i) reaction temperature, (ii) amount of catalyst, (iii) amount of chain transfer agent, (iv) amount of cyclodiolefinic components in feed.

Other objects and features of the invention will be apparent from the following detailed description and the appending claims.

DETAILED DESCRIPTION OF THE INVENTION

The petroleum-based resin used in this invention is preferably the Friedel-Crafts polymerization product of a cracked petroleum feed containing C5 olefins and diolefins or a mixture of C5 and C6 olefins and diolefins copolymerized with a C4 or C5 olefin or dimers thereof used as chain transfer agent. More preferably, the petroleum feed contains some cyclic diolefins like cyclopentadiene, methylcyclopentadiene, dicyclopentadiene and/or dimerization products of those and the active C5 and C6 components.

The desired increase of the amount of cyclic structures in the aliphatic resins can e.g. be achieved by increasing the reaction temperature and/or the amount of catalyst and using a cyclodiolefinic rich feed stream. The increase of the amount of cyclic structures in the resin was confirmed by finding a higher R&B softening point and/or a lower molecular weight and by a better compatibility to aromatic solvents (lower MMAP). The tackifying resins according to this invention result in a lower melt viscosity of hot melt compositions wherein they are incorporated. Futhermore, they impart excellent tack and shear properties on these hot melt compositions.

It is known that during the Friedel-Crafts polymerization of piperylene and/or isoprene besides 1,2 and 1,4 addition also a part of the monomers is cyclodimerized before polymerization or even cyclizises after the polymerization.

Finding a higher R&B softening point together with a similar or even lower molecular weight, or a lower molecular weight at a similar or even higher R&B softening point indicates a higher amount of cyclic structures in the resin. It was found that the amount of cyclic structures could be influenced by varying the polymerization conditions, like catalyst level, reaction temperature, amount of chain transfer agent and the feed composition.

In one embodiment of the present invention, the aliphatic petroleum tackifier resin comprises a Friedel-Crafts polymerized petroleum feed comprising C5 and C6 olefins and/or diolefins, and preferably cycloolefins and cyclodiolefins, like cyclopentadiene, methylcyclopentadiene and their dimers copolymerized with a C4 or C5 olefins and/or dimers as chain transfer agent. The final adhesive application properties of such resins are optimized by controlling the amount of cyclic structures by varying the reaction temperature, the amount of catalyst, the amount of chain transfer agent and the feed composition. It is thus possible to obtain resins with a desired softening point and molecular weight distribution during the polymerization process independent of each other. A higher degree of cyclic structures means a more rigid structure confirmed by finding a higher R&B softening point together with a similar or even lower molecular weight, or a lower molecular weight at a similar or even higher R&B softening point than in a resin having a lower amount of cyclic structures. It was also observed that such resins had a better compatibility in aromatic solvents, as could be seen by the lower MMAP cloud point. This was not due to any significant incorporation of aromatic components because the proton NMR analyses showed no significant differences between regular aliphatic resins and the resins prepared according to this invention.

The ultimate resins of this invention have the following properties:

a) an R&B softening point varying from about 75 to about 110° C., b) an Mw from about 1000 to about 2600 Dalton, a z-average molecular weight (Mz) from about 1900 to about 5000 Dalton and an Mw/Mn below about 2.0, Mn indicating the number average molecular weight, c) a level of aromatic protons below about 1.5% with respect to all protons determined by $^1$H NMR.

d) an MMAP cloud point of about 90° C. or less.

These polymerized resins can be used as tackifiers in hot melt pressure sensitive compositions which further comprise a polymer and optionally an extender oil and other adjuvants.

A preferred hot melt pressure sensitive composition according to the invention comprises a mixture of:

(i) about 100 parts by weight of a styrene-isoprene-styrene (S-I-S) block copolymer like Kraton D 1107, Kraton D KX 601 Cs, Kraton D 1114, Vector 4111, containing about 10 to about 30 parts per weight styrene.

(ii) about 70 to about 200 parts by weight per 100 parts polymer of a petroleum-based aliphatic resin having a) a Ring and Ball (R&B) softening point in the range of about 75 to about 110° C., b) a weight average molecular weight (Mw) of about 1000 to about 2600 Dalton, a z-average molecular weight (Mz) from about 1900 to about 5000 Dalton and an Mw/Mn below about 2.0, and c) a level of aromatic protons below about 1.5% with respect to all protons determined by $^1$H NMR.

In this embodiment, the petroleum tackifier resin (ii) to be included may have an MMAP of about 90° C. or less, but this is not essential.

(iii) the mixture may also contain some extender oil in a amount of about 0 to about 70 parts by weight per 100 parts polymer, like Shellflex 451 FC.

The hot melt composition of the invention has a melt viscosity at 175° C. of less than about 100,000, preferably less than about 80,000 mPas measured according to ASTM-D3236 with a Brookfield viscosity meter. The use of the resin (ii) according to this embodiment in such a hot melt pressure sensitive adhesive composition results in a lower melt viscosity than the use of known aliphatic resins like Piccotac 95E and Escorez 1310, a rolling ball tack comparable to existing aliphatic or aromatic modified resins like Piccotac 95E or Escorez 2203 or Hercotac 1148 and a better high temperature shear strength than aromatic modified resins like Escorez 2203, Hercotac 1148 and Hercules RESIN A. The above commercial resins of which the trade names were given are described in more detail in the Experimental Section (Materials & Methods) below.

Commonly, the resins of the present invention are prepared by Friedel-Crafts polymerization in which a mixture of a cracked petroleum feed and a chain transfer agent in an inert solvent is treated with about 1.0 to about 8.0 wt % of a catalyst such as aluminum chloride, aluminum bromide, aluminum fluoride, boron trifluoride, or solutions, slurries or complexes thereof, applying reaction temperatures between about 0 and about 100° C.

The ultimate polymerization feeds normally contain about about 20 to about 60 and preferably about 30 to about 50 wt % of a petroleum feed stream, about 0 to about 20 wt % chain transfer agent and about 40 to about 80 wt % inert solvent like toluene or a plant recycled solvent. A suitable polymerization feed contains between about 30 and about 50 wt % and preferably between about 35 and about 45 wt % of polymerisable monomers so the ultimate yield per total feed will be between about 30 and about 50 wt %.

The petroleum feed streams generally contain unsaturated hydrocarbons consisting of C5 and C6 olefins and/or diolefins boiling in the range from about 20 to about 100° C., preferably from about 30 to about 70° C. The cyclopentadiene and methylcyclopentadiene has generally been removed by heatsoaking the C5/C6 olefinic and diolefinic fraction at temperatures between about 100 and about 160° C. and fractionation of the obtained dimers by distillation. It is however found that feedstocks containing cycloolefinic and cyclodiolefinic components like cyclopentadiene and dicyclopentadiene contribute to more cyclic and rigid structures in the resins which eventually results in a better adhesive performance in a hot melt pressure sensitive formulation (see example 3). Other cyclic dienes which are formed by co-dimerization of the cyclic dienes with C5 linear conjugated dienes or other reactive olefinic components in the petroleum feed stream, can also contribute to a higher degree of cyclic structures in the final resin.

Average compositions of two used petroleum feed streams, with and without cyclodiolefins are given below.

|  | Without | With Cyclodiolefins |
|---|---|---|
| Feed | A | B |
| Total olefins: | 13 | 11 |
| Total cycloolefins: | 17 | 14 |
| Total diolefins: | 65 | 55 |
| Total cyclodiolefins: | <2 | 15 |

Examples of olefins are: isobutylene, 1-pentene, 2-methyl-1-pentene and trans and cis 2-pentene.

Examples of cycloolefins are cyclopentene and cyclohexene.

Examples of diolefins are cis and trans-piperylene (1,3-pentadiene), 1,4-pentadiene, isoprene, 1,3-hexadiene and 1,4-hexadiene.

Examples for cyclodiolefins are cyclopentadiene, dicyclopentadiene, methyl and ethyl derivatives of both components and codimers of the cyclopentadiene and the diolefins.

A commercial sample of a petroleum feed without any cyclodiolefins is Shell's (NL) super piperylene concentrate and a commercial sample of the preferred petroleum feed containing the desired cyclodiolefins is Shell's (NL) regular piperylene concentrate. The cyclodiolefinic components can of course also be added to a cyclodiolefinic poor stream.

A particularly suitable petroleum stream contains at least 70 wt % of polymerisable monomers with at least 50 wt % piperylene. Further it contains less than 2 wt % isoprene. To obtain the lowest possible melt viscosity of the hot melt pressure sensitive adhesive composition it contains at least 10 wt % cyclopentene and at least about 10 wt % and preferably at least about 15 wt % of cyclodiolefinic components like cyclopentadiene and/or dicyclopentadiene.

As chain transfer agent generally isobutylene, 2-methyl-1-butene, 2-methyl-2-butene or their dimeric oligomers are used to obtain resins with a lower and narrower molecular weight distribution. The components can be applied pure or diluted in an inert solvent like toluene or unreactive C4 to C6 components. An example for such a stream is isobutylene Raffinate 1 ex DSM. Isoamylene (2-methyl-2-butene) as chain transfer agent results a relatively high R&B softening point at a similar molecular weight compared to other chain transfer agents. For cost price reasons it is preferred to use isobutylene pure or in a diluted form.

Addition of more chain transfer agent decreases both, the R&B softening point and the molecular weight.

The solvent used during the polymerization is pure toluene or plant recycled toluene. The plant recycled toluene is preferred because the use of plant toluene containing unreacted compounds originating from the petroleum feed stream, like cyclopentane, n-pentane, isopentane and cyclohexane, results in a higher R&B softening point at a similar molecular weight as compared to the use of pure toluene.

The catalyst for the polymerization is used in an amount of about 1.0 to about 8.0 wt %, preferably about 3.0 to about 6.0 wt % and more preferably about 4.0 to about 5.0 wt % based on the amount of polymerisable components in the polymerization feed. It is found in this invention that a higher catalyst level, optionally in combination with a higher temperature, lowers the molecular weight while the resin softening point is kept constant. The resulting resin has a lower melt viscosity in a hot melt pressure sensitive composition. The increase of the catalyst level also increases the compatibility to aromatic solvents as reflected by a lower MMAP cloud point (see example 1). The catalyst can be chosen from any suitable Friedel-Crafts catalyst, such as aluminum trichloride, aluminum bromide, aluminum fluoride, titanium tri and tetrachloride, tin tetrachloride, boron trifluoride, or solutions, slurries or complexes thereof.

Usually polymerization temperatures are between about 0 and about 100° C. but preferred in this invention is the range from about 50 to about 120° C. It was found that a higher reaction temperature resulted in a more cyclic structure reflected by a lower molecular weight when the resin softening point is kept constant. Again the resulting resin caused a lower melt viscosity in the hot melt pressure sensitive composition together with excellent tack and shear properties (see example 2).

The polymerization can be carried out in a continuous process or in a batch mode. The reaction time is typically from about 1.0 to about 4.0 hours and depends inter alia on the reaction temperature.

After polymerization the residual catalyst may be removed by, for example, addition and extraction with water.

The thus obtained polymer-solvent mixtures may be stripped to remove unreacted hydrocarbons, solvents and low molecular weight oligomers. The final resin usually has a higher softening point.

Thus obtained resins which are most suitable for use as tackifiers according to this invention have:

a) a R&B softening point varying from about 75 to about 110° C., preferably from about 90 to about 100° C.

b) an Mn from about 600 to about 1300, preferably from about 700 to about 1000 Dalton, an Mw from about 1000 to about 2600, preferably below about 2000 Dalton, a z-average molecular weight (Mz) from about 1900 to about 5000, preferably below 4000 Dalton and an Mw/Mn below about 2.0.

c) a level of aromatic protons below about 1.5% with respect to all protons determined by NMR.

d) an MMAP cloud point of about 90° C. or less.

Normally, the MMAP cloud point of commercially available non-modified aliphatic resins based on similar petroleum feed streams is about 90° C. or higher, whereas lower MMAP values could only be obtained with aromatic modified resins. This is illustrated in the following table:

|  | R&B (° C.) | Mz (Dalton) | MMAP (° C.) | Remarks |
| --- | --- | --- | --- | --- |
| Escorez 2203 | 94 | 3200 | 88 | Aromatic Modified |
| Escorez 1310 | 94 | 3000 | 96 | Aliphatic Resin |
| Wingtack 95 | 99 | 2900 | 100 | Aliphatic Resin |
| Piccotac ® 95E | 95 | 3400 | 95 | Aliphatic Resin |
| Hercotac ® 1148 | 96 | 4000 | 88 | Aromatic Modified |

In contrast thereto, it was observed that due to the improved compatibility of the resins of the present invention, the MMAP cloud point decreased as a function of the amount of cyclic structures.

A particular preferred tackifier for use in a hot melt pressure sensitive composition has the following typical properties (see also example 4):

| R&B Softening point (° C.) | 96 |
| --- | --- |
| MMAP (° C.) | 86 |
| Aromatic protons (NMR) | 0.7 |
| Color 50% in toluene (Gardner) | 6 |
| Mn (Dalton) | 830 |
| Mw (Dalton) | 1460 |
| Mz (Dalton) | 2800 |

The control of the amount of cyclic structures can be carried out by varying the catalyst level and the reaction temperature. Furthermore, the desired R&B softening point which is also expected to depend on the amount of cyclic structures can be controlled by the amount of chain transfer agent. Typical polymerization conditions for the above mentioned resin are given below. Because the amount of cyclic components in the feed is also influencing the final amount of cyclic structures in the resin and thus the ultimate melt viscosity of a hot melt pressure sensitive composition, a preferred composition is given as well.

| Temperature: | 55° C. |
| --- | --- |
| Catalyst level: | 4.0 wt % per total of polymerisable monomers |
| Polymerization feed: | |
| isobutylene* | 8.7 |
| isoamylene* | 2.7 |
| trans-piperylene* | 13.4 |
| cis-piperylene* | 8.1 |
| cyclopentadiene* | 1.0 |
| dicyclopentadiene* | 5.5 |
| cyclopentene | 8.3 |
| toluene | 32.5 |
| cis-2-pentene | 1.0 |
| trans-2-pentene | 1.5 |
| cyclopentane | 7.4 |
| other C5's | 9.9 |
| total polymerisable material(*) | 39.4 |

The resins according to this invention can be blended with S-I-S polymers and additives to obtain a hot melt pressure sensitive adhesive composition having a low melt viscosity together with excellent tack and shear performance. Such a hot melt pressure sensitive adhesive composition can be used in a variety of forms. One form of utility is where the hot melt pressure sensitive adhesive is applied to a surface of a substrate, such as paper, foil or film and such substrates may be in the form of an adhesive tape or a label. Particularly preferred application forms are adhesive tapes and labels.

The hot melt pressure sensitive adhesive composition generally consists of an S-I-S block copolymer, a petroleum tackifier resin as described in this invention and other additives as known in the art like hydrocarbon extender oils, antioxidants, colorants, fillers etc. Suitable extender oils are selected from the group of aromatic oils, naphthenic oils, paraffinic oils or mixtures of those.

The quantity of the petroleum resin used in combination with the block copolymer may range from about 70 to about 200 parts by weight per 100 parts of block copolymer. A more preferred range is from about 90 to about 150 parts by weight per 100 parts block copolymer.

Where used, the amount of extender oil is added at a level up to about 70 parts per weight per 100 parts block copolymer, more preferably in a range from about 5 to about 50 parts by weight.

The S-I-S block copolymers can be selected from the group of polymers containing about 0 to about 30 parts per weight of styrene and about 0 to about 40 parts per weight of diblocks. Examples of such polymers are Kraton D 1107, Kraton D KX 601 Cs, Kraton D 1114 and Vector 4111.

As mentioned earlier, a hot melt formulation according to this invention preferably exhibits a melt viscosity of below about 100,000 mPas (CPS) measured at 175° C. and more preferably lower than about 60,000 mPas at 175° C. The most preferred melt viscosity at 175° C. is in the range from about 35,000 to about 50,000 mpas. Because the decrease of the viscosity is not caused by adding aromatic monomers to the polymerization feed, the resin according to this invention has advantages over other well known resins used in this kind of application:

1. Because of more cyclic structures, the resin has a lower melt viscosity than aliphatic resins like Piccotac 95E and Escorez 1310 in a comparable hot melt pressure sensitive composition.

2. Because of more cyclic structures and hence a lower molecular weight of the resin, the hot melt composition containing the resin according to this invention has a rolling ball tack which is comparable to or even better than existing aliphatic or aromatic modified resins like Piccotac 95E or Escorez 2203 and Hercotac 1148.

3. Because very little aromates are built in, resins made according to this invention give better high temperature shear strengths than aromatic modified resins like Escorez 2203, Hercotac 1148 and Hercules RESIN A.

The invention will be further described in detail with reference to the following examples which are provided herein for purposes of illustration.

EXAMPLES

Examples 1 to 4 illustrate the effects of the polymerization conditions on the resin properties. The advantages on the ultimate melt viscosity at 175° C. are also demonstrated in a formulation with Kraton D 1107 and Shellflex FC 451 in a Polymer/Resin/Oil weight fraction of 100/120/20.

The resin according to this invention which is used in the following examples will be hereinafter called: Inventive aliphatic hydrocarbon resin, or briefly: Inventive Resin.

A typical composition of the used petroleum feed streams (with and without cyclodiolefins) and the plant recycled solvent is given below:

| Stream | Super piperylene | Regular piperylene | Solvent |
|---|---|---|---|
| Feed | A | B | |
| isobutylene* | 0.0 | 0.0 | 0.0 |
| n-pentane | 0.2 | 0.0 | 1.5 |
| isoprene* | 0.5 | 0.5 | 0.0 |
| trans-2-pentene | 1.8 | 0.9 | 2.5 |
| cis-2-pentene | 3.0 | 1.9 | 2.2 |
| isoamylene* | 7.8 | 5.6 | 0.3 |
| t-piperylene* | 40.8 | 33.2 | 0.1 |
| c-piperylene* | 23.0 | 18.7 | 0.0 |
| cyclopentene | 16.6 | 13.4 | 6.7 |
| cyclopentane | 4.8 | 3.8 | 18.3 |
| cyclopentadiene* | 0.6 | 4.7 | 0.0 |
| dicyclopentadiene* | 0.0 | 9.4 | 0.0 |
| other C5 + C6's | 1.1 | 4.4 | 16.0 |
| Toluene | 0.0 | 0.0 | 2.4 |
| monomers(*) | 72.6 | 72.2 | 0.5 |

Not all mentioned resins in the examples were prepared using exactly the same above mentioned feed streams but these compositions are given because these results are typical and represent all other used petroleum feeds and solvents. The catalyst used in the examples was a 52 wt % $AlCl_3$ solution.

The abbreviations and trade names used in the following are explained in the Experimental Section below.

Example 1

Table 1 shows the effect of using more catalyst for a feed with and a feed without cyclodiolefinic components on the final resin properties.

TABLE 1

| Effect of catalyst level | | | | |
|---|---|---|---|---|
| Feed | A | A | B | B |
| Ex. No. | 1a | 1b | 1c | 1d |
| Piperylene (A/B) | 41.3 | 41.3 | 36.0 | 36.0 |
| PR solvent | 58.7 | 58.7 | 64.0 | 64.0 |
| Catalyst | 3.0 | 5.0 | 3.0 | 5.0 |
| Temperature | 55 | 55 | 45 | 45 |
| Isobutylene | 12 | 12 | 13 | 13 |
| R&B | 89.2 | 89.3 | 90.1 | 93.1 |
| MMAP | 94 | 92 | 90 | 88 |
| Color | 3.6 | 4.7 | 5.2 | 6.1 |
| Mn | 728 | 689 | 920 | 871 |

TABLE 1-continued

| Effect of catalyst level | | | | |
|---|---|---|---|---|
| Mw | 1366 | 1235 | 1648 | 1444 |
| Mz | 2158 | 1941 | 3019 | 2525 |
| Pd | 1.88 | 1.79 | 1.79 | 1.66 |
| Viscosity | 52900 | 1500 | 52200 | 44200 |
| Ball tack (cm) | 1.2 | 2.0 | 1.6 | 2.4 |
| PEEL to STEEL (N/25 mm) | 13.1 | 11.7 | 15.2 | 17.1 |
| LOOP tack (N/25 mm) | 25.4 | 21.4 | 28.8 | 26.4 |
| SAFT (0.5 kg, ° C.) | 97 | 95 | 94 | 93 |
| Shear to carton (40° C., 1 kg, min) | 1130 | 731 | 85 | 56 |
| Shear to steel (40° C., 2.5 kg, min) | 38 | 52 | 98 | 37 |
| Shear to steel (70° C., 0.5 kg, min) | 744 | 584 | 960 | 876 |

The results clearly show that due to a higher catalyst level the MMAP and the molecular weight decrease while the R&B softening points remain almost the same or show a slight increase. The viscosity drastically decreases when more catalyst is used.

Example 2

Table 2 shows the effect of using higher reaction temperatures for a feed with and a feed without cyclodiolefinic components on the final resin properties.

TABLE 2

| Effect of temperature | | | | |
|---|---|---|---|---|
| Feed | A | A | B | B |
| Ex. No. | 2a | 2b | 2c | 2d |
| Piperylene (A/B) | 41.3 | 41.3 | 36.0 | 36.0 |
| PR solvent | 58.7 | 58.7 | 64.0 | 64.0 |
| Catalyst | 5.0 | 5.0 | 3.0 | 3.0 |
| Temperature | 15 | 55 | 45 | 65 |
| Isobutylene | 12 | 12 | 13 | 13 |
| R&B | 83.3 | 89.3 | 90.1 | 92.0 |
| MMAP | 93 | 92 | 90 | 89 |
| Color | 2.4 | 4.7 | 5.2 | 6.2 |
| Mn | 975 | 689 | 920 | 801 |
| Mw | 1501 | 1235 | 1648 | 1417 |
| Mz | 2402 | 1941 | 3019 | 2636 |
| Pd | 1.54 | 1.79 | 1.79 | 1.77 |
| Viscosity | 50700 | 41500 | 52200 | 41200 |
| Ball tack (cm) | 1.0 | 2.0 | 1.6 | 1.6 |
| PEEL to STEEL (N/25 mm) | 11.9 | 11.7 | 15.2 | 14.1 |
| LOOP tack (N/25 mm) | 26.3 | 21.4 | 28.8 | 28.3 |
| SAFT (0.5 kg, ° C.) | 96 | 95 | 94 | 93 |
| Shear to carton (40° C., 1 kg, min) | 856 | 731 | 85 | 32 |
| Shear to steel (40° C., 2.5 kg, min) | 37 | 52 | 98 | 140 |
| Shear to steel (70° C., 0.5 kg, min) | 597 | 584 | 960 | 952 |

The results clearly show that due to a higher temperature the MMAP and the molecular weight decrease slightly while the R&B softening point shows an increase. Using higher temperatures, the melt viscosity decreases drastically.

When the temperature is increased from 60 to 80 and 100° C. the same trends for the resin properties were observed. The results are given in the table below.

TABLE 3

Effect of temperature

| Feed | B | B | B |
|---|---|---|---|
| Ex. No. | 2e | 2f | 2g |
| Piperylene (B) | 40.0 | 40.0 | 40.0 |
| PR solvent | 60.0 | 60.0 | 60.0 |
| Catalyst | 3.6 | 3.6 | 3.6 |
| Temperature | 60 | 80 | 100 |
| Isobutylene | 8.0 | 8.0 | 8.0 |
| R&B | 94.1 | 99.6 | 101.5 |
| MMAP | 85 | 82 | 78 |
| Color | 5.5 | 6.9 | 8.7 |
| Mn | 874 | 828 | 765 |
| Mw | 1393 | 1374 | 1394 |
| Mz | 2490 | 2751 | 3368 |
| Pd | 1.59 | 1.66 | 1.82 |
| Viscosity (mPas) | 42800 | 37100 | 29500 |
| Ball tack (cm) | 1.4 | 2.0 | 2.0 |
| PEEL to STEEL (N/25 mm) | 14.8 | 17.0 | 15.6 |
| LOOP tack (N/25 mm) | 24.6 | 27.7 | 24.9 |
| SAFT (0.5 kg, °C.) | 94 | 96 | 96 |
| Shear to carton (40° C., 1 kg, min) | 27 | 51 | 29 |
| Shear to steel (40° C., 2.5 kg, min) | 158 | 157 | 173 |
| Shear to steel (70° C., 0.5 kg, min) | 890 | 1038 | 1380 |

Example 3

Table 4 illustrates the advantage of using a feed containing more cycloolefins and cyclodiolefins. For the example resins were chosen having a similar R&B softening point and molecular weight.

TABLE 4

Effects of the feed composition

| Feed | A | B | A | B |
|---|---|---|---|---|
| Ex. No. | 3a | 3b | 3c | 3d |
| Piperylene (A/B) | 41.3 | 36.0 | 41.3 | 36.0 |
| PR solvent | 58.7 | 64.0 | 58.7 | 64.0 |
| Catalyst | 3.0 | 3.0 | 4.0 | 3.75 |
| Temperature | 55 | 65 | 35 | 50 |
| Isobutylene | 4.0 | 7.0 | 8.0 | 10.0 |
| R&B | 104.5 | 104.9 | 95.1 | 96.1 |
| MMAP | 95 | 89 | 94 | 87 |
| Color | 2.9 | 5.7 | 2.7 | 5.6 |
| Mn | 1146 | 928 | 1075 | 837 |
| Mw | 2076 | 1906 | 1759 | 1548 |
| Mz | 4024 | 4207 | 3023 | 3042 |
| Pd | 1.81 | 2.05 | 1.64 | 1.85 |
| Viscosity | 76000 | 50000 | 68200 | 37900 |
| Ball tack (cm) | 1.7 | 3.8 | 2.2 | 3.0 |
| PEEL to STEEL (N/25 mm) | 16.1 | 19.0 | 15.3 | 20.7 |
| LOOP tack (N/25 mm) | 27.0 | 31.4 | 27.5 | 32.8 |
| SAFT (0.5 kg, °C.) | 98 | 95 | 101 | 93 |
| Shear to carton (40° C., 1 kg, min) | 1321 | 149 | 511 | 232 |
| Shear to steel (40° C., 2.5 kg, min) | 303 | 288 | 89 | 120 |
| Shear to steel (70° C., 0.5 kg, min) | 1180 | 1056 | 1014 | 809 |

The examples clearly show that resins with similar R&B softening points and molecular weights are different with respect to the MMAP and the melt viscosity of the hot melt pressure sensitive composition. The presence of the cyclodiolefins, like cyclopentadiene and dicyclopentadiene contribute already for a great part to the cyclic character of the resin and cause a lower melt viscosity of the hot melt formulation and a lower MMAP of the resin. Generally it is seen that in case of the presence of cyclic diolefins more catalyst or a higher temperature and more chain transfer agent is necessary to obtain a similar R&B and molecular weight. The use of a feed containing the cycloolefins and cyclodiolefins seems to broaden the molecular weight distribution slightly.

Example 4

The resins in table 5 are examples of resins with the most preferred properties for use as tackifiers in hot melt adhesive compositions.

TABLE 5

Optimal resins based on both feeds

| Feed | A | B | B | B |
|---|---|---|---|---|
| PP | 4a | 4b | 4c | 4d |
| Piperylene (A/B) | 41.3 | 36.0 | 40.0 | 36.0 |
| PR solvent | 58.7 | 64.0 | 60.0 | 64.0 |
| Catalyst | 4.0 | 4.0 | 4.0 | 3.75 |
| Temperature | 70 | 55 | 55 | 50 |
| Isobutylene | 6.0 | 10.0 | 9.0 | 10.0 |
| R&B | 98.0 | 97.1 | 96.5 | 96.1 |
| MMAP | 93 | 87 | 86 | 87 |
| Color | 4.5 | 6.1 | 5.9 | 5.6 |
| Mn | 901 | 802 | 827 | 837 |
| Mw | 1470 | 1436 | 1459 | 1548 |
| Mz | 2596 | 2595 | 2806 | 3042 |
| Pd | 1.63 | 1.79 | 1.76 | 1.85 |
| Viscosity | 49200 | 43000 | — | 37900 |
| Ball tack (cm) | 2.6 | 3.2 | — | 3.0 |
| PEEL to STEEL (N/25 mm) | 14.5 | 17.3 | — | 20.7 |
| LOOP tack (N/25 mm) | 19.1 | 34.0 | — | 32.8 |
| SAFT (0.5 kg, °C.) | 102 | 95 | — | 93 |
| Shear to carton (40° C., 1 kg, min) | 337 | 155 | — | 232 |
| Shear to steel (40° C., 2.5 kg, min) | 73 | 168 | — | 120 |
| Shear to steel (70° C., 0.5 kg, min) | 1446 | 1309 | — | 809 |

Especially 4b, 4c and 4d are good examples of resins made according to this invention. All three resins are within the scope of this invention as defined by the appending claims and all are based on a feed containing cyclodiolefinic components. The resins of example 4b and 4d show good ball tack and sufficiently high shear strengths.

Example 5

To determine whether the MMAP decrease was caused by the incorporation of toluene from the process solvent or by the cyclization reaction, IR and NMR analyses were conducted to determine the amount of aromatic protons present in the resin.

TABLE 6

NMR results of several samples

| Resin | 6.5–7.5 ppm | 4.7–5.4 ppm | 0.5–3 ppm |
|---|---|---|---|
| RESIN B | 7.84 | 5.00 | 87.15 |
| RESIN C | 2.58 | 2.87 | 94.55 |
| INVENTIVE RESIN | 0.69 | 2.76 | 96.55 |
| HERCURES ® C | 0.87 | 4.15 | 94.98 |
| PICCOTAC ® 95E | 0.59 | 3.37 | 96.04 |

The table shows the percentages of aromatic protons (between 6.5 and 7.5 ppm) compared to the percentage of =CH$_2$-like protons (4.7 to 5.4 ppm) and aliphatic protons (0.5 to 3.0 ppm).

It is clearly shown that the amount of protons in the aromatic range for the Inventive Resin is comparable to other aliphatic resins like Hercures® C and Piccotac° 95E. The latter two resins have an MMAP of 93 to 95° C. while the Inventive Resin has an MMAP of 86° C. RESIN C, which is a 5 wt % per resin aromatic modified aliphatic resin having an MMAP of 85° C., showed a significantly higher amount of aromatic protons. A higher aromatic modified resin (RESIN B, about 18 wt % per resin aromatic modified) showed a higher amount of aromatic protons.

Example 6

Table 7 shows the results of several resins in a hot melt pressure sensitive adhesive composition in comparison to each other.

TABLE 7

HM PSA performance in Kraton D 1107

| Ex. No. | 6a | 6b | 6c | 6d |
| --- | --- | --- | --- | --- |
| Kraton D 1107 | 100 | 100 | 100 | 100 |
| INVENTIVE RESIN | 120 | | | |
| RESIN B | | 120 | | |
| PICCOTAC ®95E | | | 120 | |
| HERCOTAC ®1148 | | | | 120 |
| Shellflex 451 FC | 20 | 20 | 20 | 20 |
| Irganox 1010 | 2 | 2 | 2 | 2 |
| Viscosity at 175° C. (mPas) | 37900 | 58800 | 59500 | 45500 |
| Ball tack (cm) | 3.0 | 7.0 | 3.6 | 5.7 |
| PEEL to STEEL (N/25 mm) | 20.7 | 17.1 | 16.9 | 19.9 |
| LOOP tack (N/25 mm) | 32.8 | 29.0 | 30.5 | 30.8 |
| SAFT (0.5 kg, ° C.) | 93 | 93 | 96 | 97 |
| Shear to carton (40° C., 1 kg, min) | 232 | 391 | 723 | 620 |
| Shear to steel (40° C., 2.5 kg, min) | 120 | 353 | 201 | 121 |
| Shear to steel (70° C., 0.5 kg, min) | 809 | 310 | 1326 | 691 |

The results clearly show that the melt viscosity and the rolling ball tack using the resin of the present invention, is the best of all the tested resins. The shear to carton at 40° C. is not significantly different for the four resins. The shear to steel at 70° C. for the Inventive Resin is better for using Hercotac 1148 and Hercules RESIN B (about 18 wt % per resin aromatic modified aliphatic resin). The use of Piccotac 95E (aliphatic resin) results in a better high temperature shear to steel but also in a higher viscosity.

The Inventive Resin was also compared with some competitive resin samples. Tested were Escorez 1310 LC, an aliphatic resin like Piccotac 95E, and Escorez 2203 LC, a slightly aromatic modified resin comparable to Hercotac 1148.

Further Hercules RESIN A was compared as well. Hercules RESIN A is like Hercules RESIN B a more aromatic modified resin than Escorez 2203 and Hercotac 1148.

TABLE 8

HM PSA performance in Kraton D 1107

| Ex. No. | 6a | 6b | 6c | 6d |
| --- | --- | --- | --- | --- |
| Kraton D 1107 | 100 | 100 | 100 | 100 |
| INVENTIVE RESIN | 120 | | | |
| Escorez 1310 LC | | 120 | | |
| Escorez 2203 LC | | | 120 | |
| RESIN A | | | | 120 |
| Shellflex 451 FC | 20 | 20 | 20 | 20 |
| Irganox 1010 | 2 | 2 | 2 | 2 |
| Viscosity at 175° C. (mPas) | 37900 | 85400 | 45000 | 40000 |
| Ball tack (cm) | 3.0 | 2.6 | 3.8 | 6.6 |

TABLE 8-continued

HM PSA performance in Kraton D 1107

| Ex. No. | 6a | 6b | 6c | 6d |
| --- | --- | --- | --- | --- |
| PEEL to STEEL (N/25 mm) | 20.7 | 14.5 | 17.8 | 18.1 |
| LOOP tack (N/25 mm) | 32.8 | 19.1 | 30.7 | 25.7 |
| SAFT (0.5 kg, ° C.) | 93 | 102 | 95 | 85 |
| Shear to carton (40° C., 1 kg, min) | 232 | 337 | 242 | 383 |
| Shear to steel (40° C., 2.5 kg, min) | 120 | 73 | 134 | 177 |
| Shear to steel (70° C., 0.5 kg, min) | 809 | 1446 | 781 | 102 |

The results clearly show again that the melt viscosity and the rolling ball tack using the Inventive Resin are comparable to a slightly aromatic modified resin like Escorez 2203 LC. The rolling ball tack using Hercules RESIN A was found to be higher due to the higher molecular weight. The hot melt viscosity using Escorez 1310 LC is higher than observed for Piccotac 95E and especially the Inventive Resin. The shear to steel at 70° C. using the Inventive Resin was found to be better than for the Hercules RESIN A. The use of Escorez 1310 LC gives a better high temperature shear to steel like found for Piccotac 95E but also gives the highest viscosity.

Example 7

The inventive aliphatic hydrocarbon resin was also evaluated in other S-I-S polymers in the same Polymer/Resin/Oil ratio.

TABLE 9

HM PSA performance in compositions with different polymers

| Ex. No. | 7a | 7b | 7c | 7d |
| --- | --- | --- | --- | --- |
| Kraton D 1107 | 100 | | | |
| Kraton D KX-601-CS | | 100 | | |
| Kraton D 1114-X | | | 100 | |
| Vector 4111 | | | | 100 |
| INVENTIVE RESIN | 120 | 120 | 120 | 120 |
| Shellflex 451 FC | 20 | 20 | 20 | 20 |
| Irganox 1010 | 2 | 2 | 2 | 2 |
| Viscosity at 175° C. (mPas) | 37900 | 48200 | 37800 | 47200 |
| Ball tack (cm) | 3.0 | 1.6 | 1.8 | 1.6 |
| PEEL to STEEL (N/25 mm) | 20.7 | 15.6 | 14.7 | 14.3 |
| LOOP tack (N/25 mm) | 32.8 | 27.2 | 24.6 | 26.3 |
| SAFT (0.5 kg, ° C.) | 93 | 95 | 101 | 100 |
| Shear to carton (40° C., 1 kg, min) | 232 | 980 | 1204 | 924 |
| Shear to steel (40° C., 2.5 kg, min) | 120 | 63 | 325 | 175 |
| Shear to steel (70° C., 0.5 kg, min) | 809 | 1647 | 5210 | 3604 |

The results clearly show that the use of the aliphatic resin of the present invention results in a low hot melt viscosity together with good balanced tack and shear properties in all four polymers.

Example 8

In table 10 some results are given varying the resin and oil amounts in the adhesive formulation. Vector 4111 was used as polymer.

TABLE 10

HM PSA performance for several formulations

| Ex. No. | 8a | 8b | 8c | 8d |
|---|---|---|---|---|
| Vector 4111 | 100 | 100 | 100 | 100 |
| Vector 4111 (wt %) | 42 | 45 | 45 | 36 |
| INVENTIVE RESIN | 120 | 118.6 | 98.5 | 148.6 |
| INVENTIVE RESIN (wt %) | 50 | 53 | 44 | 53 |
| Shellflex 451 FC | 20 | 5.2 | 25.4 | 37.8 |
| Shellflex 451 FC (wt %) | 8 | 2 | 11 | 11 |
| Irganox 1010 | 2 | 2 | 2 | 2 |
| Viscosity at 175° C. (mPas) | 51600 | 121200 | 63500 | 21800 |
| Ball tack (cm) | 2.6 | 3.0 | 1.0 | 1.0 |
| PEEL to STEEL (N/25 mm) | 16.7 | 17.0 | 13.5 | 19.3 |
| LOOP tack (N/25 mm) | 35.6 | 31.1 | 27.7 | 38.1 |
| SAFT (0.5 kg, ° C.) | 103 | 111 | 101 | 101 |
| Shear to carton (40° C., 1 kg, min) | 409 | 351 | 89 | 60 |
| Shear to steel (40° C., 2.5 kg, min) | 639 | 1342 | 298 | 574 |
| Shear to steel (70° C., 0.5 kg, min) | 2718 | 14000 | 835 | 900 |

The above formulations indicate that the amounts of polymer, resin and oil can be varied to control the hot melt viscosity while tack and shear properties still remain sufficient.

EXPERIMENTAL SECTION—MATERIALS & METHODS ABBREVIATIONS

In the above text and tables, the following abbreviations were used:

| | |
|---|---|
| PR solvent | Solvent used for the Polymerisation Reaction |
| R&B | Ring and Ball softening point (measured as described below) |
| MMAP | Mixed Methylcyclohexane Aniline Cloud Point (measured as described below) |
| Mn | Number average molecular weight |
| Mw | Weight average molecular weight |
| Mz | z-average molecular weight |
| Pd | Polydispersity (=Mw/Mn) |
| AH formulation | Number of the hot melt adhesive |
| HM PSA | Hot Melt Pressure Sensitive Adhesive |
| SAFT | Shear Adhesion Failure Temperature |

METHODS
Method for the Preparation of the resins:

All resins mentioned herein were prepared in a continuous process, but a batch production would also be possible. The resin feed was dried over a calciumchloride and a molecular sieve drier and added together with the chain transfer agent with a rate of 1500 ml/h to a continuously stirred tank reactor of 6 liter capacity. The catalyst was simultaneously added and the mixture was circulated from the bottom of the reactor to the catalyst inlet point. The mixture was continuously removed at a level of 3 liters so that the reaction time for all experiments was 2 hours. The mixture was deactivated with water and washed in three steps with water before it was stripped under vacuum and with steam to remove the solvent and all the low molecular weight materials.

Method for the determination of the R&B softening point:
The R&B (Ring and Ball) softening point was determined according to ASTM D-36-70 with the Walter Herzog R&B apparatus, model MC-735.

Method for the determination of the MMAP:
The MMAP (Mixed Methylcyclohexane Aniline Cloud point) was determined using a modified ASTM D-611-82 procedure. The Methylcyclohexane is substituted for the heptane used in the standard test procedure. The procedure uses resin/aniline/methylcyclohexane in a ratio 1/2/1 (5 g/10 ml/5 ml), and the cloud point is determined by cooling a heated, clear blend of the three components until a complete turbidity just occurs.

Method for the determination of the resin color:
To determine the Gardner color the resin was mixed with reagent grade toluene at room temperature until all the resin was dissolved. The color was determined spectrophotometrically using the Dr. Lange LICO 200 apparatus.

Method for the determination of the molecular weights:
The molecular weights Mn, Mw, Mz and the polydispersity (=Mw/Mn) were determined by size exclusion chromatography using a refractive index detector.

Method for the determination of the NMR spectra:
The NMR spectra of the resin were determined in $CDCl_3$ as solvent.

Method for the determination of the viscosity:
The hot melt viscosity was determined using a brookfield viscosity meter at 175° C. by ASTM D-3236.

Method for the determination of the peel strength:
The peel strength is measured by a PSTC-1 test.

Method for the determination of the ball tack:
The ball tack is measured by a PSTC-6 test.

Method for the determination of the Loop tack:
The loop tack is measured by a FINAT-9 test.

Method for the determination of the shear strength:
The shear strengths were measured by a PSTC-7 test.

Method for the determination of the SAFT:
The Shear adhesion failure temperature (SAFT) was determined according to the Hercules test method WI 20/1/W126.

MATERIALS
Materials used in preparing the adhesive compositions as mentioned in the examples are as follows:

Shellflex 451 FC—A paraffinic extender oil available from Shell.

KRATON D 1107—A olystyrene-polyisoprene-polystyrene (S-I-S) triblock copolymer of Shell Chemical having a styrene content of 15 wt %, a diblock content of 19 wt %, a melt flow rate of 9 g/10 min and a weight average molecular weight of 205,000 Dalton.

KRATON D KX-601-CS—A polystyrene-polyisoprene-polystyrene (S-I-S) triblock copolymer of Shell Chemical having a styrene content of 15 wt %, a diblock content of 19 wt %, a melt flow rate of 9 g/10 min and a weight average molecular weight of 205,000 Dalton.

KRATON D 1114-X—A linear polystyrene-polyisoprene-polystyrene triblock copolymer supplied by Shell Chemical having a styrene content of 19.0 wt %, a melt flow rate of 11 g/10 min, a weight average molecular weight of about 160,000 and 0 wt % diblocks (SI).

Vector 4111 S-I-S—A linear polystyrene-polyisoprene-polystyrene triblock copolymer supplied by Dexco Polymers having a styrene content of 19.0 wt %, a melt flow rate of 11 g/10 min, a weight average molecular weight of about 170,000, and 0 wt % diblocks (SI).

Hercules Hercotac 1148 hydrocarbon resin—A petroleum resin available from Hercules containing about 5 to 10 wt % of a polymerized aromatic monomer and having a softening point of about 95° C.

Hercules Piccotac x95E hydrocarbon resin—A petroleum resin without any polymerized aromatic components having a softening point of about 95° C. and number average molecular weight of about 1100 Dalton.

Escorez 1310 LC—A petroleum resin available from Exxon containing about 0.3% by weight of polymerized styrene and having a softening point of about 93.5° C.

Escorez 2203 LC—A petroleum resin available from Exxon containing about 8 to 10 wt % of polymerized styrene and having a softening point of about 92° C. and a number average molecular weight of about 1150.

Wingtack 95—A petroleum resin available from Good Year like Piccotac 95E and Escorez 1310 having a softening point of about 96° C. and a number average molecular weight of about 1100.

Hercules RESIN A hydrocarbon resin—A petroleum resin available from Hercules containing about 10 to 25 wt % of some polymerized aromatic monomers and having a softening point of about 95° C.

Hercules RESIN B hydrocarbon resin—A petroleum resin available from Hercules containing about 10 to 25 wt % of a polymerized aromatic monomer and having a softening point of about 92° C. and a color of about 3 Gardner.

Hercules RESIN C hydrocarbon resin—A petroleum resin available from Hercules containing about 3 to 10 wt % of a polymerized aromatic monomer and having a softening point of about 94° C.

Irganox 1010—an antioxidant containing mainly pentaerythrityl-tetrakis[3-(3,5-di-tert.butyl-4-hydroxyphenyl)-propionate as commercial sample from Ciba-Geigy.

While the invention has been described with respect to specific embodiments, it should be understood that they are not intended to be limited, and that variations and modifications are possible without departing from the scope of the appended claims.

What we claim is:

1. A petroleum-based aliphatic resin having
   a) a Ring and Ball (R&B) softening point in the range of about 75 to about 110° C.,
   b) a weight average molecular weight (Mw) of about 1000 to about 2600 Dalton, a z-average molecular weight (Mz) from about 1900 to about 5000 Dalton and an Mw/Mn below about 2.0,
   c) a level of aromatic protons below about 1.5% with respect to all protons determined by $^1$H-NMR, and
   d) a mixed methylcyclohexane aniline cloud point (MMAP) of 90° C. or less.

2. The resin according to claim 1 wherein the R&B softening point is between about 90 and about 100° C.

3. The resin according to claim 1 which has an Mw below about 2000 Dalton, an Mz below about 4000 Dalton and an Mw/Mn below about 2.0.

4. A hot melt pressure sensitive adhesive composition comprising a polymer and a petroleum based aliphatic resin, wherein said petroleum-based aliphatic resin has:
   a) a Ring and Ball (R&B) softening point in the range of about 75 to about 110° C.,
   b) a weight average molecular weight (Mw) of about 1000 to about 2600 Dalton, a z-average molecular weight (Mz) from about 1900 to about 5000 Dalton and an Mw/Mn below about 2.0,
   c) a level of aromatic protons below about 1.5% with respect to all protons determined by $^1$H-NMR, and
   d) a mixed methylcyclohexane aniline cloud point (MMAP) of about 90° C. or less.

5. The hot melt pressure sensitive adhesive composition according to claim 4, wherein said polymer is selected from a styrene-isoprene-styrene (S-I-S) polymer, a styrene-butadiene (SB) polymer, a styrene-butadiene-styrene (SBS) polymer, an ethylene-vinylacetate-polymer (EVA), and a butadiene-vinylacetate-polymer (BVA).

6. The hot melt pressure sensitive adhesive composition according to claim 5, wherein the polymer is an S-I-S block copolymer containing about 10 to about 30 parts by weight of styrene.

7. The hot melt pressure sensitive adhesive composition according to claim 4 which further includes an extender oil.

8. The hot melt pressure sensitive adhesive composition according to claim 7 which contains about 70 to about 200 parts by weight of a petroleum-based aliphatic resin, about 100 parts by weight of a polymer and about 0 to about 70 parts by weight of an extender oil.

9. The hot melt pressure sensitive adhesive composition according to claim 8 which comprises:
   a) about 100 parts by weight of a Styrene-Isoprene-Styrene (S-I-S) rubber;
   b) about 70 to about 200 parts by weight of a petroleum-based aliphatic resin having:
      a Ring and Ball (R&B) softening point in the range of about 75 to about 110° C.;
      a weight average molecular weight (Mw) of about 1000 to about 2600 Dalton, a z-average molecular weight (Mz) from about 1900 to about 5000 Dalton and an Mw/Mn below about 2.0;
      a level of aromatic protons below about 1.5% with respect to the total protons determined by $^1$H-NMR; and
   c) about 0 to about 70 parts by weight of an extender oil, characterized in that the composition has a viscosity of about 100,000 mPas or less, measured according to ASTM method D3236 at 175° C. with a Brookfield viscosity meter.

10. The hot melt pressure sensitive adhesive composition according to claim 9 which has a viscosity of about 80,000 in mPas or less at 175° C.

11. The hot melt pressure sensitive adhesive composition according to claim 10 which has a viscosity of about 35,000 to about 50,000 mPas at 175° C.

12. An adhesive tape comprising a substrate and a hot melt pressure sensitive composition comprising a polymer and a petroleum based aliphatic resin, wherein said petroleum-based aliphatic resin has:
   a) a Ring and Ball (R&B) softening point in the range of about 75 to about 110° C.,
   b) a weight average molecular weight (MW) of about 1000 to about 2600 Dalton, a z-average molecular weight (Mz) from about 1900 to about 5000 Dalton and an Mw/Mn below about 2.0,
   c) a level of aromatic protons below about 1.5% with respect to all protons determined by $^1$H-NMR, and
   d) a mixed methylcyclohexane aniline cloud point (MMAP) of about 90° C. or less.

13. The adhesive tape of claim 12, wherein the hot melt pressure sensitive composition comprises:
   a) about 100 parts by weight of a Styrene-Isoprene-Styrene (S-I-S) rubber;
   b) about 70 to about 200 parts by weight of a petroleum-based aliphatic resin having:
      a Ring and Ball (R&B) softening point in the range of about 75 to about 110° C.;
      a weight average molecular weight (Mw) of about 1000 to about 2600 Dalton, a z-average molecular weight (Mz) from about 1900 to about 5000 Dalton and an Mw/Mn below about 2.0;
      a level of aromatic protons below about 1.5% with respect to the total protons determined by $^1$H-NMR; and
   c) about 0 to about 70 parts by weight of an extender oil, characterized in that the composition has a viscosity of about 100,000 mPas or less, measured according to ASTM method D3236 at 175° C. with a Brookfield viscosity meter.

14. The adhesive tape of claim 13, wherein the hot melt pressure sensitive composition comprises:
 a) about 100 parts by weight of a Styrene-Isoprene-Styrene (S-I-S) rubber;
 b) about 70 to about 200 parts by weight of a petroleum-based aliphatic resin having:
  a Ring and Ball (R&B) softening point in the range of about 75 to about 110° C.;
  a weight average molecular weight (Mw) of about 1000 to about 2600 Dalton, a z-average molecular weight (Mz) from about 1900 to about 5000 Dalton and an Mw/Mn below about 2.0;
  a level of aromatic protons below about 1.5% with respect to the total protons determined by $^1$H-NMR; and
 c) about 0 to about 70 parts by weight of an extender oil, characterized in that the composition has a viscosity of about 100,000 mPas or less, measured according to ASTM method D3236 at 175° C. with a Brookfield viscosity meter.

15. A label comprising a substrate and a hot melt pressure sensitive composition comprising a polymer and a petroleum based aliphatic resin, wherein said petroleum-based aliphatic resin has:
 a) a Ring and Ball (R&B) softening point in the range of about 75 to about 110° C.,
 b) a weight average molecular weight (Mw) of about 1000 to about 2600 Dalton, a z-average molecular weight (Mz) from about 1900 to about 5000 Dalton and an Mw/Mn below about 2.0,
 c) a level of aromatic protons below about 1.5% with respect to all protons determined by $^1$H-NMR, and
 d) a mixed methylcyclohexane aniline cloud point (MMAP) of about 90° C. or less.

16. The label of claim 15, wherein the hot melt pressure sensitive composition is selected from a styrene-isoprene-styrene (S-I-S) polymer, a styrene-butadiene (SB) polymer, a styrene-butadiene-styrene (SBS) polymer, an ethylene-vinylacetate-polymer (EVA), and a butadiene-vinylacetate-polymer (BVA).

17. The label of claim 16, wherein the hot melt pressure sensitive composition comprises:
 a) about 100 parts by weight of a Styrene-Isoprene-Styrene (S-I-S) rubber;
 b) about 70 to about 200 parts by weight of a petroleum-based aliphatic resin having:
  a Ring and Ball (R&B) softening point in the range of about 75 to about 110° C.;
  a weight average molecular weight (Mw) of about 1000 to about 2600 Dalton, a z-average molecular weight (Mz) from about 1900 to about 5000 Dalton and an Mw/Mn below about 2.0;
  a level of aromatic protons below about 1.5% with respect to the total protons determined by $^1$H-NMR; and
 c) about 0 to about 70 parts by weight of an extender oil, characterized in that the composition has a viscosity of about 100,000 mPas or less, measured according to ASTM method D3236 at 175° C. with a Brookfield viscosity meter.

* * * * *